(12) United States Patent
Polny

(10) Patent No.: US 10,759,325 B1
(45) Date of Patent: Sep. 1, 2020

(54) VEHICLE TOWING APPARATUS FOR USE WITH A HOOK TRUCK

(71) Applicant: John Polny, Millville, MA (US)

(72) Inventor: John Polny, Millville, MA (US)

( * ) Notice: Subject to any disclaimer, the term of this patent is extended or adjusted under 35 U.S.C. 154(b) by 189 days.

(21) Appl. No.: 16/056,611

(22) Filed: Aug. 7, 2018

(51) Int. Cl.
*B60P 3/12* (2006.01)
*B60D 1/02* (2006.01)
*B60D 1/52* (2006.01)
*B60D 1/155* (2006.01)
*B60D 1/30* (2006.01)
*B60D 1/14* (2006.01)

(52) U.S. Cl.
CPC ............. *B60P 3/125* (2013.01); *B60D 1/02* (2013.01); *B60D 1/143* (2013.01); *B60D 1/155* (2013.01); *B60D 1/30* (2013.01); *B60D 1/52* (2013.01)

(58) Field of Classification Search
CPC .......... B60P 3/125; B60D 1/145; B60D 1/155
See application file for complete search history.

(56) References Cited

U.S. PATENT DOCUMENTS

| | | | |
|---|---|---|---|
| 1,794,148 A | 2/1931 | Collins | |
| 2,512,635 A * | 6/1950 | Flowers | B60P 3/125 414/563 |
| 2,555,663 A * | 6/1951 | Schouboe | B60P 3/125 414/563 |
| 3,924,763 A | 12/1975 | Pigeon | |
| 4,473,237 A | 9/1984 | Lind | |
| 4,573,857 A | 3/1986 | Porter, Sr. | |
| 4,875,269 A | 10/1989 | Crist | |
| 6,942,443 B2 * | 9/2005 | Shubert | B60P 3/125 280/502 |
| 7,618,228 B2 | 11/2009 | Luciano | |
| 2005/0111948 A1 | 5/2005 | Nolasco | |
| 2019/0135060 A1 * | 5/2019 | Frisz | B60P 3/125 |

FOREIGN PATENT DOCUMENTS

CA            986155       3/1976

* cited by examiner

*Primary Examiner* — Kevin Hurley
(74) *Attorney, Agent, or Firm* — Kyle A. Fletcher, Esq.

(57) ABSTRACT

The vehicle towing apparatus for use with a hook truck comprises a tow bar, a left chain, and a right chain. The front end of the tow bar comprises either a pintle hook or a lunette ring for coupling to a tow vehicle. By way of example and not of limitation, the tow vehicle may be a hooklift truck. The tow bar comprises a first section and a second section, which are slidably coupled to each other. The overall length of the tow bar may be fixed by inserting a lock pin through the tow bar. The left and right chains are safety chains that may connect between the sides of the tow bar and the tow vehicle. The vehicle towing apparatus for use with a hook truck may further comprise a clevis tow bar adapter for use with a hitch receiver of a towed vehicle.

15 Claims, 4 Drawing Sheets

VEHICLE TOWING APPARATUS FOR USE WITH A HOOK TRUCK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of towing, more specifically, a vehicle towing apparatus for use with a hook truck.

SUMMARY OF INVENTION

The vehicle towing apparatus for use with a hook truck comprises a tow bar, a left chain, and a right chain. The front end of the tow bar comprises either a pintle hook or a lunette ring for coupling to a tow vehicle. By way of example and not of limitation, the tow vehicle may be a hooklift truck. The tow bar comprises a first section and a second section, which are slidably coupled to each other. The overall length of the tow bar may be fixed by inserting a lock pin through the tow bar. The left and right chains are safety chains that may connect between the sides of the tow bar and the tow vehicle. The vehicle towing apparatus for use with a hook truck may further comprise a clevis tow bar adapter for use with a hitch receiver of a towed vehicle.

An object of the invention is to provide a tow bar suitable for use with a vehicle having a pintle hook or lunette ring.

Another object of the invention is to provide a length adjustment for the tow bar.

A further object of the invention is to provide chains and chain attachment hook rings for safety and ease of use.

Yet another object of the invention is to provide a clevis tow bar adapter for coupling to a hitch received of a towed vehicle.

These together with additional objects, features and advantages of the vehicle towing apparatus for use with a hook truck will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle towing apparatus for use with a hook truck in detail, it is to be understood that the vehicle towing apparatus for use with a hook truck is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle towing apparatus for use with a hook truck.

It is therefore important that the claims be regarded as including such equivalent construction insofar as they do not depart from the spirit and scope of the vehicle towing apparatus for use with a hook truck. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
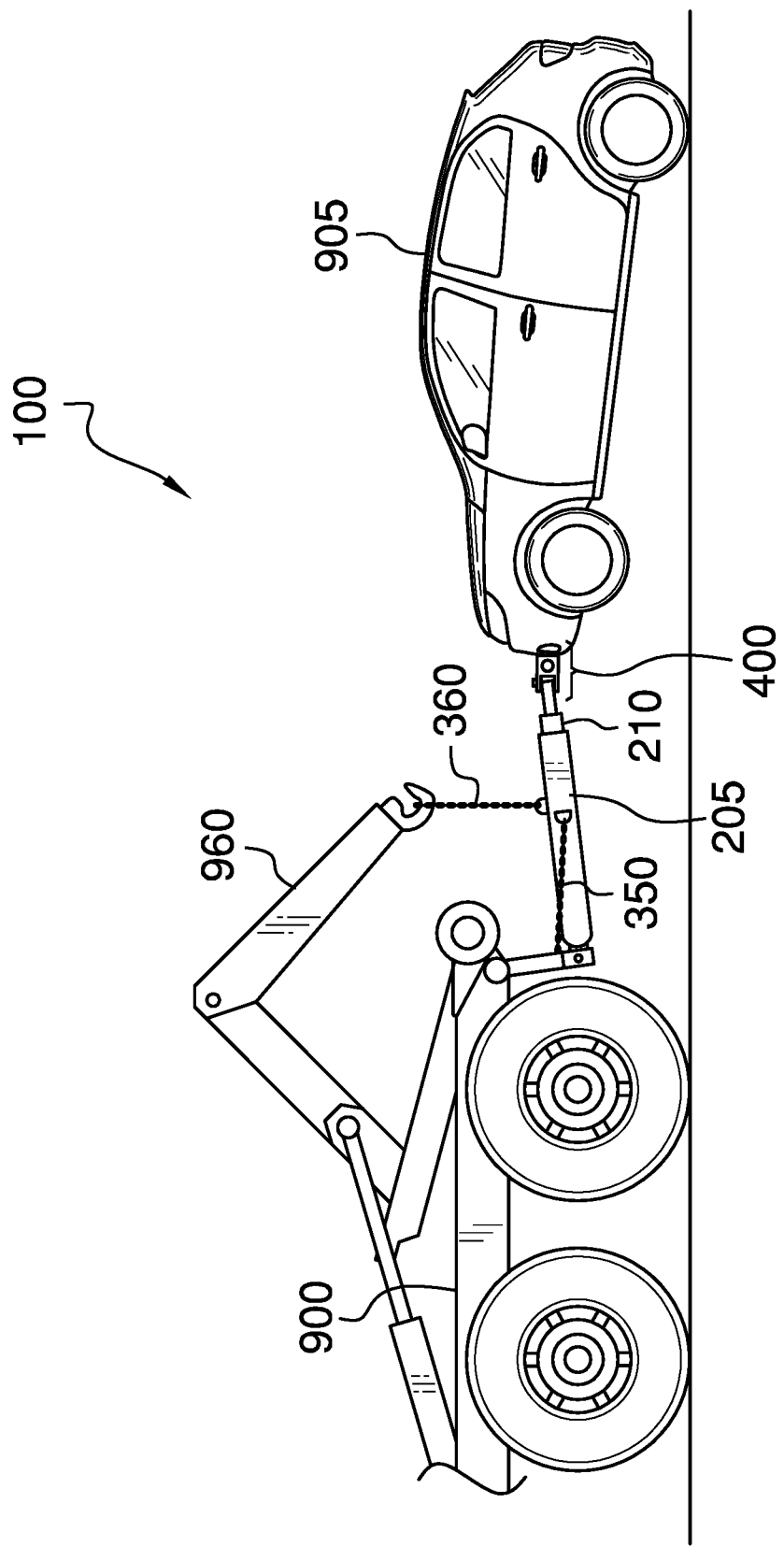
FIG. 1 is an elevation view of an embodiment of the disclosure showing use of the invention.
Figure 2:
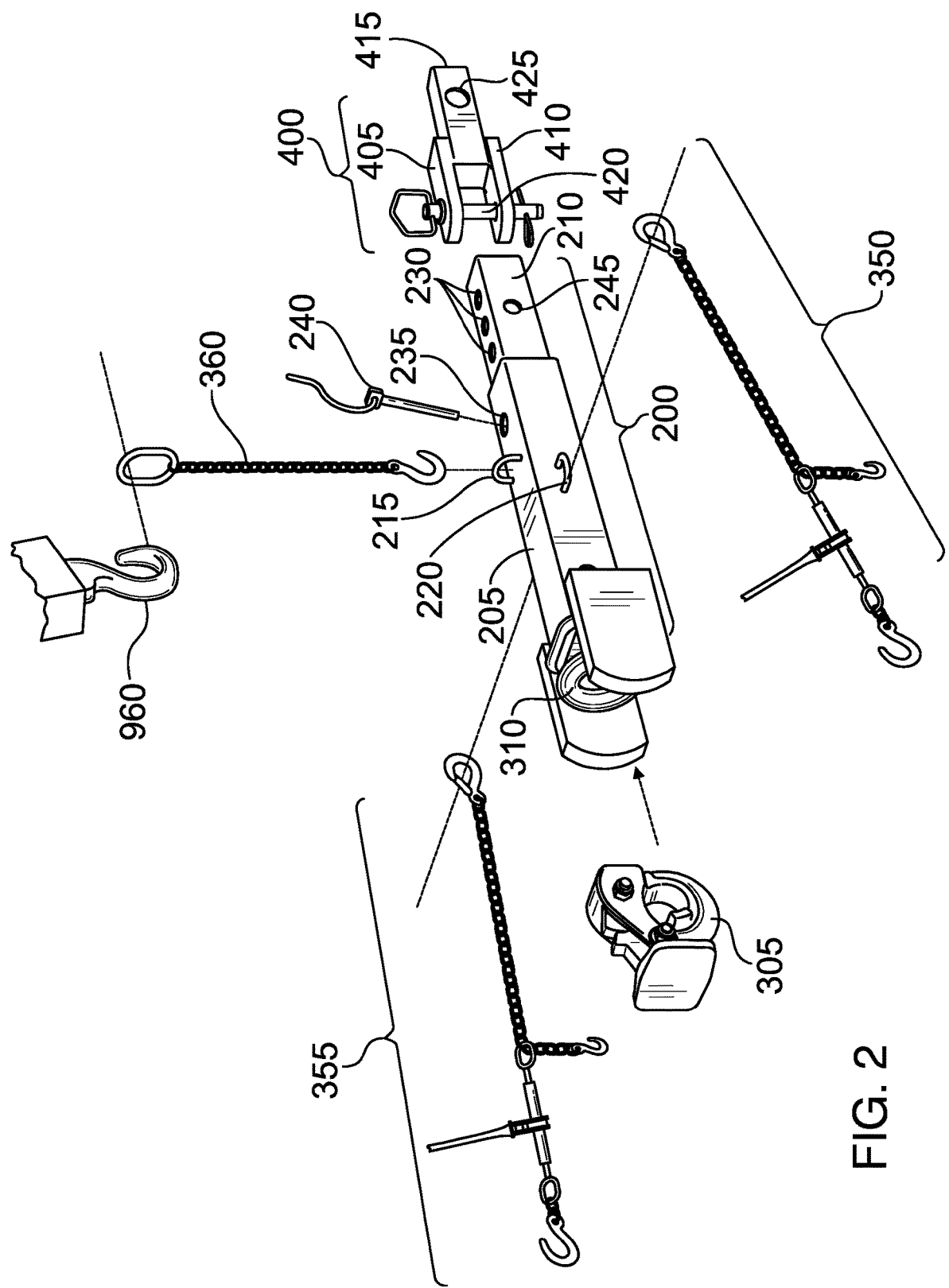
FIG. 2 is an exploded view of the pintle hook or lunette ring termination on the front.
Figure 3:
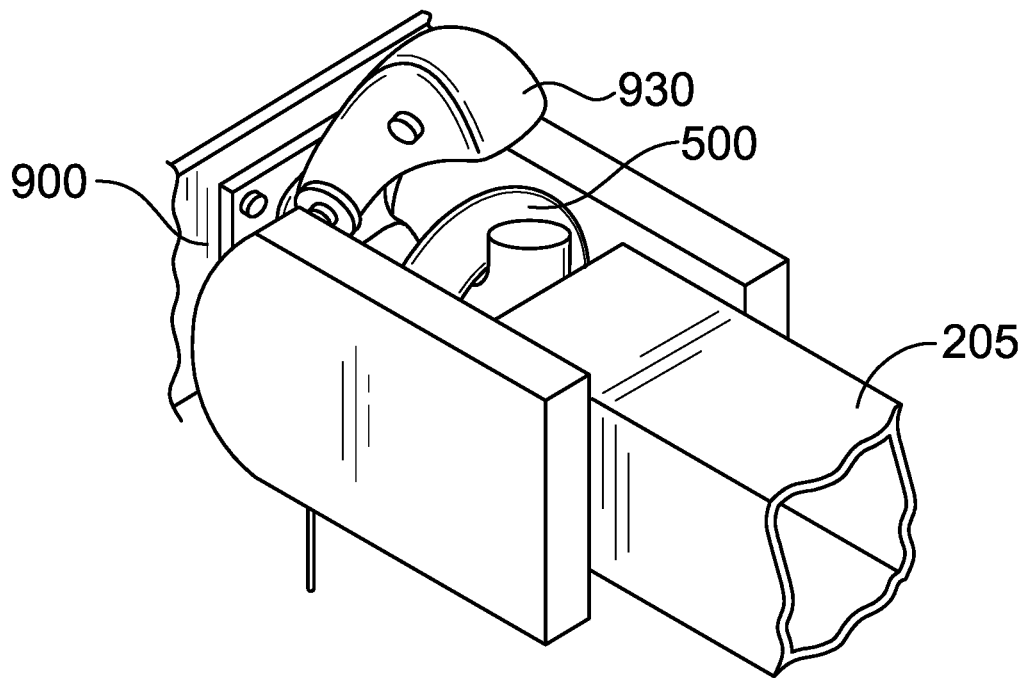
FIG. 3 is a perspective view of an embodiment of the disclosure illustrating the lunette ring coupled to the tow bar.
Figure 4:
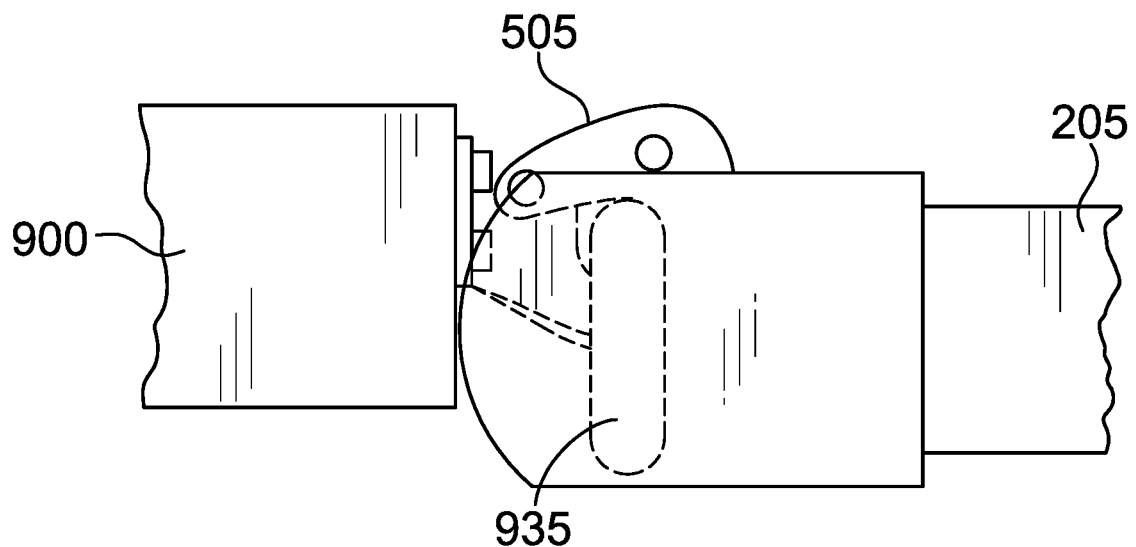
FIG. 4 is an elevation view of an embodiment of the disclosure illustrating the pintle hook coupled to the tow bar.
Figure 5:
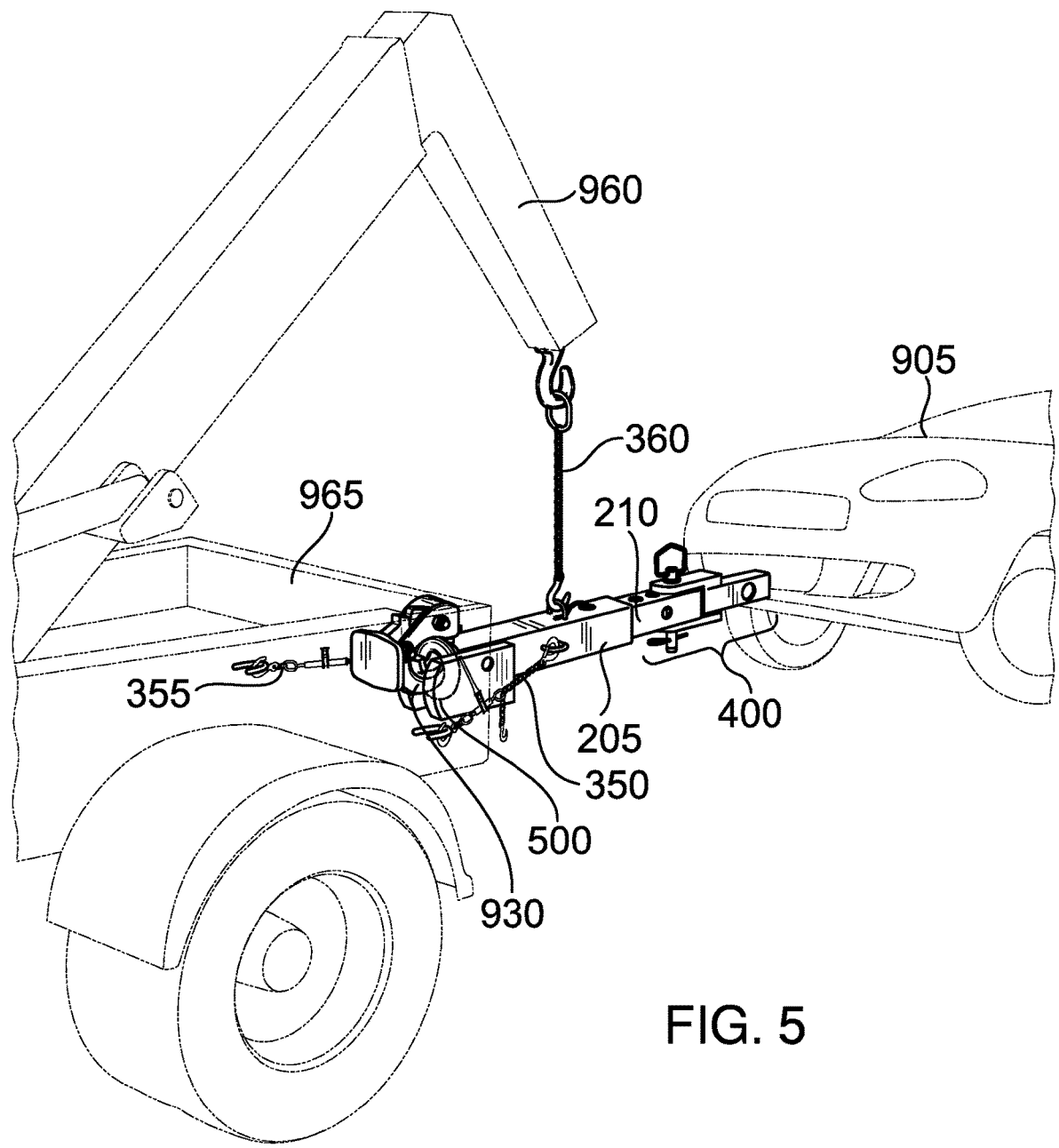
FIG. 5 is a perspective view of an embodiment of the disclosure illustrating use of the invention.

Detailed reference will now be made to a first potential embodiment of the disclosure, which is illustrated in FIGS. 1 through 5.

The vehicle towing apparatus for use with a hook truck 100 (hereinafter invention) comprises a tow bar 200, a left chain 350, and a right chain 355. The invention 100 converts a first vehicle having a pintle-towing feature into a tow vehicle 900 and is used by the first vehicle to tow a second vehicle.

The tow bar 200 comprises a first section of tubing 205, a second section of tubing 210, and a pintle attachment. The first section of tubing 205 may be rigid, hollow, square tubing defined by an inner diameter measured from the inside center of one side of the first section of tubing 205 to the inside center of the opposing side of the first section of tubing 205 through the center of the first section of tubing 205.

The second section of tubing 210 may be rigid, hollow, square tubing defined by an outer diameter measured from the outside center of one side of the second section of tubing 210 to the outside center of the opposing side of the second section of tubing 210 through the center of the second section of tubing 210.

The inner diameter of the second section of tubing 210 may be less than the outer diameter of the first section of tubing 205 so that the second section of tubing 210 is free to slide into and out of the first section of tubing 205.

In some embodiments, the pintle attachment may be a pintle hook 305. The pintle hook 305 may be coupled to a forward end of the first section of tubing 205. The pintle hook 305 may mate with a mating lunette ring, which is located on the tow vehicle 900.

In some embodiments, the pintle attachment may be a lunette ring 310. The lunette ring 310 may be coupled to a forward end of the first section of tubing 205. The lunette ring 310 may mate with a mating pintle hook, which is located on the tow vehicle 900.

In general, the mating of the pintle hook 305 and the lunette ring 310 involves lifting an upper jaw of the pintle hook 305 and placing the lunette ring 310 over the bottom, hooked-shaped, jaw of the pintle hook 305. The upper jaw is then lowered onto the lower jaw and may be locked in place. With the upper jaw lowered and locked, the pintle hook and lunette ring form a pair of interlocked rings, with the pintle hook oriented vertically and the lunette ring oriented horizontally.

The pintle attachment may be permanently or removabely coupled to the front end of the first section of tubing 205. As non-limiting examples, the pintle attachment may be welded to the first section of tubing 205 or may be coupled to the first section of tubing 205 using nuts, bolts, lock washers, and/or other mechanical fasteners.

The first section of tubing 205 may comprise a pair of outer length adjustment apertures 235 located in opposing positions on the upper and lower rear surfaces of the first section of tubing 205. The second section of tubing 210 may comprise a plurality of pairs of inner length adjustment apertures (not illustrated in the figures) located in opposing positions on the upper and lower rear surfaces of the second section of tubing 210 and forming a straight line oriented from front to rear. The overall length of the tow bar 200 may be adjusted by sliding the second section of tubing 210 into or out of the first section of tubing 205 until the pair of outer length adjustment apertures 235 align with one pair of the plurality of pairs of inner length adjustment apertures.

A removable lock pin 240 may be dropped into the pair of outer length adjustment apertures 235 and down through the plurality of pairs of inner length adjustment apertures to prevent further sliding of the second section of tubing 210 relative to the first section of tubing 205. The removable lock pin 240 may have a head that is larger than the pair of outer length adjustment apertures 235 to prevent the removable lock pin 240 from falling through the pair of outer length adjustment apertures 235.

The first section of tubing 205 may comprise a left hook ring 220 and a right hook ring 225. The left hook ring 220 and the right hook ring 225 may be semi-circular, metal loops welded to the left and right sides of the first section of tubing 205, respectively. The left hook ring 220 and the right hook ring 225 may be attachment points for the left chain 350 and the right chain 355.

The left chain 350 may be a safety chain located on left side of the tow bar 200. One end of the left chain 350 may couple to the left hook ring 220 and the other end of the left chain 350 may couple to the tow vehicle 900. The right chain 355 may be a safety chain located on right side of the tow bar 200. One end of the right chain 355 may couple to the right hook ring 225 and the other end of the right chain 355 may couple to the tow vehicle 900.

The left chain 350 and the right chain 355 may act as a backup coupling between the tow bar 200 and the tow vehicle 900 in the event that the pintle hook 305 and the lunette ring 310 become disconnected. In some embodiments, the left chain 350 and/or the right chain 355 may comprise a ratchet mechanism to tighten the chains.

The rear sides of the second section of tubing 210 may comprise a pair of pull pin apertures 245 located in opposing positions on the left and right rear surfaces of the second section of tubing 210. The pair of pull pin apertures 245 may allow the rear end of the second section of tubing 210 to be coupled to a hitch receiver (not illustrated in the figures) by passing a pull pin (not illustrated in the figures) through the hitch receiver and through rear end of the second section of tubing 210.

The first section of tubing 205 may comprise a top hook ring 215. The top hook ring 215 may be a semi-circular, metal loop welded to the top surface of the first section of tubing 205. The top hook ring 215 may be an attachment point for a top chain 360. The top chain 360 may be coupled between the top hook ring 215 and a hooklift hoist 960 of a hook truck 965. The top chain 360 may be used to lift the tow bar 200 and/or to adjust the angle of the tow bar 200.

The invention 100 may comprise a clevis tow bar adapter 400. The clevis tow bar adapter 400 comprises an upper clevis plate 405, a lower clevis plate 410, a clevis shank 415, and a clevis lock pin 420. The clevis shank 415 may be coupled to and positioned between the upper clevis plate 405 and the lower clevis plate 410 with the upper clevis plate 405 and the lower clevis plate 410 extending forward from the clevis shank 415 to form a U-shaped yoke. The U-shaped yoke may be oriented vertically such that the upper clevis plate 405 is directly above the lower clevis plate 410.

A pair of clevis lock pin apertures (not illustrated in the figures) may be located in the upper clevis plate 405 and the lower clevis plate 410 and positioned to be vertically aligned with each other. The clevis tow bar adapter 400 may be coupled to the rear end of the second section of tubing 210 by placing the rear end of the second section of tubing 210 into the U-shaped yoke of the clevis tow bar adapter 400, vertically aligning the pair of clevis lock pin apertures with one pair of the plurality of pairs of inner length adjustment apertures, and dropping the clevis lock pin 420 into the pair of clevis lock pin apertures and through the plurality of pairs of inner length adjustment apertures.

The rear end of the clevis shank 415 may comprise a clevis pull pin aperture 425 running through the clevis shank 415 from the left side of the clevis shank 415 to the right side of the clevis shank 415. The clevis pull pin aperture 425 may be used to couple the clevis tow bar adapter 400 to the hitch receiver of a towed vehicle 905 by inserting the rear end of the clevis shank 415 into the hitch receiver of the towed vehicle 905 and passing the pull pin through the clevis pull pin aperture 425 and the hitch receiver.

In use, the tow vehicle 900 having the pintle attachment is positioned in front of the towed vehicle 905. If the clevis tow bar adapter 400 is to be used, the clevis tow bar adapter 400 is coupled to the front of the towed vehicle 905 by inserting the clevis shank 415 into the hitch receiver of the towed vehicle 905 and passing the pull pin through the clevis shank 415 and by inserting the rear end of the second section of tubing 210 into the U-shaped yoke at the front of the clevis tow bar adapter 400, vertically aligning the pair of clevis lock pin apertures with one pair of the plurality of pairs of inner length adjustment apertures, and dropping the clevis lock pin 420 into the pair of clevis lock pin apertures and through the plurality of pairs of inner length adjustment apertures.

Depending upon the embodiment, a first pintle hook 505 may be located on the front of the first section of tubing 205 or a first lunette ring 500 may be located on the front of the first section of tubing 205. The tow vehicle 900 is backed towards the towed vehicle 905 until the first pintle hook 505 on the first section of tubing 205 aligns with a second lunette ring 935 on the tow vehicle 900 or until the first lunette ring 500 on the first section of tubing 205 aligns with a second pintle hook 930 on the tow vehicle 900. Once they are aligned, the first pintle hook 505 may be coupled to the second lunette ring 935 or the first lunette ring 500 may be coupled to the second pintle hook 930. If necessary, the top chain 360 may be coupled between the top hook ring 215 and the hooklift hoist 960 of the hook truck 965 to assist in lifting and positioning the tow bar 200. The left chain 350 and the right chain 355 may be installed between the left hook ring 220 and the hook truck 965 and between the right hook ring 225 and the hook truck 965 to act as a safeguard.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "align" refers to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" is an opening in a surface. Aperture may be synonymous with hole, slit, crack, gap, slot, or opening.

As used in this disclosure, a "chain" is a series of interlinked rings that form a cord like structure. Like a cord, a chain has tensile strength but is too flexible to provide compressive strength and is not suitable for use in pushing objects. The rings to form a chain are often formed from a metal.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "front" indicates the side of an object that is closest to a forward direction of travel under normal use of the object or the side or part of an object that normally presents itself to view or that is normally used first. "Rear" or "back" refers to the side that is opposite the front.

As used herein, a "hitch receiver" is the portion of a trailer hitch which is permanently mounted to a vehicle and which presents a rectangular open tube at the rear center of the vehicle into which a ball hitch or cargo accessory may be coupled.

As used in this disclosure, a "hook" is an object that is curved or bent at an angle such that items can be hung on or caught by the object.

As used herein, a "hooklift truck", also known as a hook truck, is a truck equipped with a hydraulic hooklift hoist. The hooklift hoist may be used to move a platform or container onto and off of the truck chassis. The hooklift hoist may sometimes be used in conjunction with hydraulic ram equipment on the same truck. As a non-limiting example, the hooklift truck may be able to drag a dumpster body full of refuse onto the truck chassis, haul the dumpster body to a remote location, and drop the dumpster body on the ground at the remote location for further processing of the refuse.

As used in this disclosure, the term "inner diameter" refers to a diameter measured from one inner surface of the object to the same inner surface on the opposing side of the object.

As used herein, a "pintle hitch" is a device for coupling a tow vehicle to a towed vehicle. The pintle hitch uses a pintle hook on one vehicle and a lunette ring (sometimes referred to as a pintle ring) on the other. The pintle hook comprises a fixed lower jaw that forms a hook and a moveable upper jaw. The upper jaw may be lifted to allow the lunette ring to be placed over the hook of the lower jaw. The upper jaw may then be lowered against the lower jaw and locked in place. With the upper jaw lowered and locked, the pintle hook and lunette ring form a pair of interlocked rings, with the pintle hook oriented vertically and the lunette ring oriented horizontally.

As used herein, the term "pintle towing feature" refers to a pintle hook or a lunette ring that is permanently attached to the front and/or the rear of a vehicle.

As used in this disclosure, a "plate" is a smooth, flat and rigid object having at least one dimension that is of uniform thickness and appears thinner than the other dimensions of the object. Plates often have a rectangular or disk like appearance. Plates may be made of any material, but are commonly made of metal.

As used in this disclosure, a "ratchet" is a device comprising a pawl or hinged catch that engages the sloping teeth of a wheel or bar permitting motion in one direction only. A "ratcheting mechanism" is a device that incorporates a ratchet. "Ratcheting motion" refers to motion along a ratcheting mechanism.

As used in this disclosure, the term "tow" is used as a verb that refers to moving an object by pulling on the object with the assistance of an apparatus or device.

As used herein, a "tow vehicle" is a vehicle that is used to tow another vehicle.

As used herein, a "towed vehicle" is a vehicle that is being pulled by a tow vehicle.

As used in this disclosure, a "vehicle" is a device that is used for transporting passengers, goods, or equipment.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle towing apparatus for use with a hook truck comprising:
a tow bar, a left chain, and a right chain;
wherein the vehicle towing apparatus for use with a hook truck converts a first vehicle having a pintle towing feature into a tow vehicle and is used by the first vehicle to tow a second vehicle;
wherein the tow bar comprises a first section of tubing, a second section of tubing, and a pintle attachment;
wherein the first section of tubing is rigid, hollow, square tubing defined by an inner diameter measured from the inside center of one side of the first section of tubing to the inside center of the opposing side of the first section of tubing through the center of the first section of tubing;
wherein the second section of tubing is rigid, hollow, square tubing defined by an outer diameter measured from the outside center of one side of the second section of tubing to the outside center of the opposing side of the second section of tubing through the center of the second section of tubing;
wherein the inner diameter of the second section of tubing is less than the outer diameter of the first section of tubing so that the second section of tubing is free to slide into and out of the first section of tubing;
wherein the first section of tubing comprises a pair of outer length adjustment apertures located in opposing positions on the upper and lower rear surfaces of the first section of tubing;
wherein the second section of tubing comprises a plurality of pairs of inner length adjustment apertures located in opposing positions on the upper and lower rear surfaces of the second section of tubing and forming a straight line oriented from front to rear;
wherein the overall length of the tow bar is adjusted by sliding the second section of tubing into or out of the first section of tubing until the pair of outer length adjustment apertures align with one pair of the plurality of pairs of inner length adjustment apertures.

2. The vehicle towing apparatus for use with a hook truck according to claim 1
wherein the pintle attachment is a pintle hook;
wherein the pintle hook is coupled to a forward end of the first section of tubing;
wherein the pintle hook mates with a mating lunette ring which is located on the tow vehicle.

3. The vehicle towing apparatus for use with a hook truck according to claim 1
wherein the pintle attachment is a lunette ring;
wherein the lunette ring is coupled to a forward end of the first section of tubing;
wherein the lunette ring mates with a mating pintle hook which is located on the tow vehicle.

4. The vehicle towing apparatus for use with a hook truck according to claim 1
wherein a removable lock pin is dropped into the pair of outer length adjustment apertures and down through the plurality of pairs of inner length adjustment apertures to prevent further sliding of the second section of tubing relative to the first section of tubing;
wherein the removable lock pin has a head that is larger than the pair of outer length adjustment apertures to prevent the removable lock pin from falling through the pair of outer length adjustment apertures.

5. The vehicle towing apparatus for use with a hook truck according to claim 4
wherein the first section of tubing comprises a left hook ring and a right hook ring;
wherein the left hook ring and the right hook ring are semi-circular, metal loops welded to the left and right sides of the first section of tubing, respectively;
wherein the left hook ring and the right hook ring are attachment points for the left chain and the right chain.

6. The vehicle towing apparatus for use with a hook truck according to claim 5
wherein the left chain is a safety chain located on left side of the tow bar;
wherein one end of the left chain couples to the left hook ring and the other end of the left chain couples to the tow vehicle.

7. The vehicle towing apparatus for use with a hook truck according to claim 6
wherein the right chain is a safety chain located on right side of the tow bar;
wherein one end of the right chain couples to the right hook ring and the other end of the right chain couples to the tow vehicle.

8. The vehicle towing apparatus for use with a hook truck according to claim 7
wherein the left chain and the right chain are a backup coupling between the tow bar and the tow vehicle in the event that the pintle hook and the lunette ring become disconnected.

9. The vehicle towing apparatus for use with a hook truck according to claim 8
wherein the left chain and/or the right chain comprises a ratchet mechanism;
wherein the ratchet mechanism tightens the chains.

10. The vehicle towing apparatus for use with a hook truck according to claim 9
wherein the rear sides of the second section of tubing comprises a pair of pull pin apertures located in opposing positions on the left and right rear surfaces of the second section of tubing;
wherein the pair of pull pin apertures allows the rear end of the second section of tubing to be coupled to a hitch receiver by passing a pull pin through the hitch receiver and through rear end of the second section of tubing.

11. The vehicle towing apparatus for use with a hook truck according to claim 10
wherein the first section of tubing comprises a top hook ring;
wherein the top hook ring is a semi-circular, metal loop welded to the top surface of the first section of tubing;
wherein the top hook ring is an attachment point for a top chain.

12. The vehicle towing apparatus for use with a hook truck according to claim 11
wherein the top chain is coupled between the top hook ring and a hooklift hoist of a hook truck;
wherein the top chain is used to lift the tow bar and/or to adjust the angle of the tow bar.

13. The vehicle towing apparatus for use with a hook truck according to claim 12
wherein the vehicle towing apparatus for use with a hook truck comprises a clevis tow bar adapter;

wherein the clevis tow bar adapter comprises an upper clevis plate, a lower clevis plate, a clevis shank, and a clevis lock pin;

wherein the clevis shank is coupled to and positioned between the upper clevis plate and the lower clevis plate with the upper clevis plate and the lower clevis plate extending forward from the clevis shank to form a U-shaped yoke;

wherein the U-shaped yoke is oriented vertically such that the upper clevis plate is directly above the lower clevis plate.

14. The vehicle towing apparatus for use with a hook truck according to claim 13 wherein a pair of clevis lock pin apertures is located on the upper clevis plate and the lower clevis plate and positioned to be vertically aligned with each other;

wherein the clevis tow bar adapter is coupled to the rear end of the second section of tubing by placing the rear end of the second section of tubing into the U-shaped yoke of the clevis tow bar adapter, vertically aligning the pair of clevis lock pin apertures with one pair of the plurality of pairs of inner length adjustment apertures, and dropping the clevis lock pin into the pair of clevis lock pin apertures and through the plurality of pairs of inner length adjustment apertures.

15. The vehicle towing apparatus for use with a hook truck according to claim 14 wherein the rear end of the clevis shank comprises a clevis pull pin aperture running through the clevis shank from the left side of the clevis shank to the right side of the clevis shank;

wherein the clevis pull pin aperture is used to couple the clevis tow bar adapter to the hitch receiver of a towed vehicle by inserting the rear end of the clevis shank into the hitch receiver of the towed vehicle and passing the pull pin through the clevis pull pin aperture and the hitch receiver.

\* \* \* \* \*